(12) United States Patent
Green

(10) Patent No.: US 7,621,635 B2
(45) Date of Patent: Nov. 24, 2009

(54) TORIC CONTACT LENSES

(75) Inventor: Timothy Green, Rochester, NY (US)

(73) Assignee: Bausch & Lamb Incorporated, Rochester, NY (US)

( * ) Notice: Subject to any disclaimer, the term of this patent is extended or adjusted under 35 U.S.C. 154(b) by 372 days.

(21) Appl. No.: 11/614,503

(22) Filed: Dec. 21, 2006

(65) Prior Publication Data
US 2007/0146628 A1 Jun. 28, 2007

Related U.S. Application Data

(60) Provisional application No. 60/753,103, filed on Dec. 22, 2005.

(51) Int. Cl.
*G02C 7/04* (2006.01)
(52) U.S. Cl. .................. 351/160 R; 351/176
(58) Field of Classification Search ..... 351/159–160 R, 351/176, 159–160 H; 623/4.1–6.64
See application file for complete search history.

(56) References Cited

U.S. PATENT DOCUMENTS

| 4,103,992 | A | * | 8/1978 | Breger et al. ............ 351/160 R |
| 4,508,436 | A | | 4/1985 | Sitterle |
| 4,573,774 | A | | 3/1986 | Sitterle |
| 4,580,882 | A | * | 4/1986 | Nuchman et al. ........... 351/161 |
| 5,455,641 | A | | 10/1995 | Hahne et al. |
| 5,601,759 | A | | 2/1997 | Apollonio |
| 5,611,970 | A | | 3/1997 | Apollonio et al. |
| 5,971,541 | A | * | 10/1999 | Danker et al. ............ 351/160 R |
| 6,079,826 | A | * | 6/2000 | Appleton et al. ......... 351/160 R |
| 6,113,236 | A | | 9/2000 | Chapman et al. |
| 6,241,355 | B1 | | 6/2001 | Barsky |
| 6,595,639 | B1 | | 7/2003 | Ho et al. |
| 7,040,757 | B2 | * | 5/2006 | Hall et al. ................ 351/160 R |
| 7,133,174 | B2 | * | 11/2006 | Back ....................... 351/160 R |
| 2003/0123024 | A1 | * | 7/2003 | Dunn ...................... 351/160 R |
| 2009/0040458 | A1 | * | 2/2009 | Ye et al. ....................... 351/176 |

FOREIGN PATENT DOCUMENTS

| EP | 0742461 A2 | 11/1996 |
| EP | 0614105 B1 | 7/1999 |
| FR | 2281584 A | 3/1976 |
| WO | WO 89/07303 A1 | 8/1989 |

OTHER PUBLICATIONS

International Standard, "ISO 18369-1," Ophthalmic Optics—Contact Lenses—Part 1, 1 ed., (p. 1-48), (Aug. 15, 2006).
Ames et al., "Factors Influencing Hydrogel Toric Lens Rotation," ICLC, Jul./Aug. 1989, (vol. 16), (Issue. 7-8), (p. 221-225).

* cited by examiner

*Primary Examiner*—Darryl J Collins
*Assistant Examiner*—Zachary Wilkes

(57) ABSTRACT

A set of toric contact lenses, each lens in the set including a posterior surface, an anterior surface, a peripheral zone and a center thickness for each lens. At least one of said surfaces includes a toric optical zone, and each lens in the set having different cylindrical correction. The center thicknesses of the lenses decreasing monotonically with increased cylindrical power.

24 Claims, 3 Drawing Sheets

TORIC CONTACT LENSES

CROSS-REFERENCE

This application claims the benefit of Provisional Patent Application No. 60/753,103 filed Dec. 22, 2005.

FIELD OF INVENTION

The present invention relates to toric contact lenses, and more particularly to series of toric contact lenses.

BACKGROUND OF THE INVENTION

Contact lenses having a toric optical zone (commonly referred to as "toric contact lenses") are used to correct refractive abnormalities of the eye associated with astigmatism. The toric optical zone provides cylindrical correction to compensate for astigmatism. Since astigmatism that requires vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. A toric surface is formed on either the posterior lens surface (to achieve a "back surface toric lens") or the anterior lens surface (to form a "front surface toric lens").

Whereas spherical contact lenses may freely rotate on the eye, toric contact lenses have a stabilization structure to inhibit rotation of the lens on the eye so that the cylindrical axis of the toric zone remains generally aligned with the axis of the astigmatism. For example, a stabilization structure may comprise one or more sections of the lens periphery which are thicker (or thinner) than other sections to provide the stabilization. For example, a ballast is a thick portion that will assume a downward position when a lens is inserted in an eye, and the ballast axis of a lens extends in the up and down direction when a lens assumes its position on the eye. Other stabilization structures are known in the art. Regardless of the structure of the stabilization structure, the axis that extends in the up and down direction when a lens assumes its position on the eye will be referred to herein as the ballast axis.

Toric contact lenses are manufactured with a selected relationship (referred to herein as offset) between the cylindrical axis of the toric optical zone and the orientation of the stabilization structure. This relationship is expressed as a number of degrees that the cylindrical axis is offset from the ballast axis. Accordingly, toric contact lens prescriptions specify offset, with toric lenses generally being offered in 5 or 10-degree increments ranging from 0 degrees to 180 degrees.

In summary, a prescription for a toric contact lens will typically specify spherical correction, cylindrical correction and offset to define the optical correction, as well as an overall lens diameter and base curve to define fitting parameters.

In prescribing a patient with a toric contact lens, practitioners conventionally use sets of diagnostic contact lenses that consist of a selected subset of a series of lenses, to determine which lens in the series will provide appropriate fitting characteristics and optical correction. For example, a series or set may comprise lenses of a common spherical power but different cylindrical powers.

It is desirable that lenses in such a series (including the lenses of a fitting set) have consistent fitting characteristics over the range of optical corrections of the series. However, a problem with toric contact lenses is that, in order to provide a series of toric lenses over a range of cylindrical corrections, thicknesses of the lenses in the series will typically vary considerably based on cylindrical correction; for example, for a series in which lenses have a common spherical power, lenses having higher cylindrical correction will have greater thicknesses in at least one portion of the lenses. This ultimately results in lenses in the series having different fitting characteristics, thereby affecting, for example on-eye comfort or lens stability at certain cylindrical corrections.

Thus, a lens fitting set or series which provides consistent fitting characteristics over a range of spherical and cylindrical corrections is highly desirable. The term "set" will be used herein below to refer to a complete series or a subset thereof.

SUMMARY

Aspects of the present invention are directed to a set of toric contact lenses, each lens in the set including a posterior surface, an anterior surface, a peripheral zone and a center thickness. For each lens, at least one of said surfaces includes a toric optical zone. Each lens in the set has different cylindrical correction, and the center thicknesses of the lenses decreases monotonically with increased cylindrical power.

In some embodiments, at least one of the lenses has a perimeter of the toric optical zone that is circular. In some embodiments, at least one of the lenses has a perimeter of the toric optical zone that is oval. At least one of the lenses may include a blend zone. In some embodiments, the overall sags of all of the lenses of the set are equal. In some embodiments, all of the lenses in the set have a same optical zone diameter as one another. (It will be understood that lenses with a circular optical zone only have a single diameter.) In some embodiments, the cylindrical power of the lenses in the set ranges from at least −0.75 diopters to at least −2.75 diopters.

In some embodiments, the thicknesses of the lenses measured at a common position differ by no more than 0.2 mm. The common position may be disposed at the top of the anterior optical zone of the lenses. In some embodiments, all of the lenses that have different cylindrical powers also have different center thicknesses.

Other aspects of the present invention are directed to a set of mold tools, comprising a plurality of first mold tools, each of the plurality of first mold tools being configured to produce a first surface of one of a plurality of lenses, the first surfaces all being anterior surfaces or all of the first surfaces being posterior surfaces, said surfaces all being toric; and a second mold tool configured to produce a second surface of each of the plurality of lenses, the plurality of first mold tools being configured such that combinations of the second mold tool with each of the plurality of first mold tools are capable of producing a set of lenses of different cylindrical power, the center thicknesses of said lenses monotonically decreasing as a function of increasing cylindrical power.

In some embodiments, the set of molds is adapted to produce a set in which the cylindrical power of the set of lenses ranges from at least −0.75 diopters to at least −2.75 diopters. In some embodiments, the thicknesses of the set of lenses measured at a common position differ by no more than 0.2 mm. In some embodiments, the common position is disposed at the top of the anterior optical zone of the lenses.

In some embodiments, the plurality of first mold tools comprises at least three tools. In other embodiments, the plurality of first mold tools comprises at least four tools. the plurality of first mold tools comprises at least five tools. In still other embodiments, the plurality of first mold tools comprises at least six tools.

Another aspect of the invention is directed to a set of mold tools, comprising a plurality of first mold tools, each of the plurality of first mold tools being configured to produce a first surface of one of a plurality of lenses, the first surfaces all being anterior surfaces or all of the first surfaces being posterior surfaces, and said surfaces all being toric. The set also comprises a plurality of second mold tools, each of the plurality of second mold tools being configured to produce a second surface of at least one of the plurality of lenses. The plurality of first mold tools and the plurality of second mold tools being configured such that combinations of ones of the plurality of second mold tool with ones of the plurality of first mold tools are capable of producing a set of lenses having a common spherical correction with the other lenses in the set and having different cylindrical power, the center thicknesses of said lenses monotonically decreasing as a function of increasing cylindrical power.

Dimensions described herein refer to dimensions of a finished contact lens.

The term "effective base curvature" is defined herein to mean the average radius of curvature of the posterior surface calculated over the entire posterior surface, including the periphery.

As used herein the term "increasing power" means increase magnitude of power. Accordingly, increasing power can refer to an increase in negative power as well as an increase positive power. It will be appreciated that both an increase in magnitude of positive power and an increase in magnitude of negative power will cause an increase in surface curvature.

BRIEF DESCRIPTION OF THE DRAWINGS

Illustrative, non-limiting embodiments of the present invention will be described by way of example with reference to the accompanying drawings, in which the same reference number is used to designate the same or similar components in different figures, and in which.

DETAILED DESCRIPTION

Figure 1:
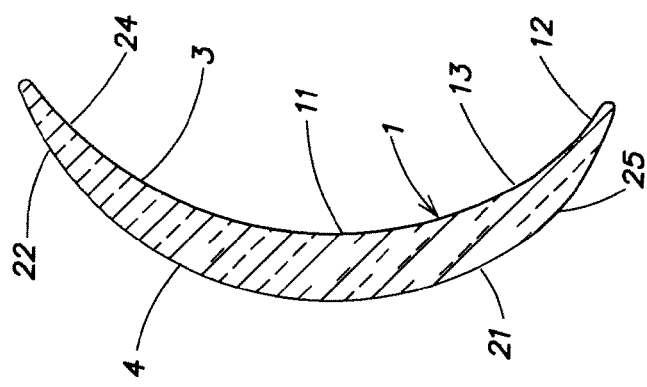
FIG. 1 schematically illustrates an examples of embodiment of a toric contact lens in a set according to aspects of the present application.

FIG. 1 schematically illustrates an example of an embodiment of a toric contact lens 1 in a set according to aspects of the present application. In the illustrated embodiment, central zone 11 (also referred to herein as the optical zone) of posterior surface 3 is toric, i.e., this zone has a surface that provides a desired cylindrical correction, and may include spherical power. It is to be appreciated that a toric surface may be specified using terms of any suitable order. Posterior surface 3 includes a peripheral zone 12 surrounding the central toric zone 11, and a blend zone 13 disposed between the peripheral zone 12 and central toric zone 11. The blend zone is a non-optically corrected region that provides a more gradual transition from the central toric zone 11 to the peripheral zone 12 than would occur if the central toric zone were immediately adjacent to peripheral zone 12.

A central zone 21 of an anterior surface 4 of toric contact lens 1 is spherical. The curvature of central zone 21 is selected such that central zone 21 in combination with central zone 11 provides a desired spherical correction of the lens. Anterior surface 4 includes at least one peripheral curve 22 surrounding central zone 21. It is to be appreciated that although the illustrated lens has a posterior surface that is toric, according to aspects of the present invention, the anterior and/or posterior surfaces may be toric.

As described above, toric lenses are provided with a stabilization structure so that the lenses maintain a desired rotational orientation on the eye. As one example, schematically shown in FIG. 1, lens 1 includes a prism ballast wherein peripheral section 24 has a different thickness than an opposed peripheral section 25 of the lens periphery. (Section 25 is at a "bottom" portion of the lens, since, when this type of toric lens is placed on the eye, the prism ballast is located downwardly.) The ballast is oriented about an axis, referred to herein as the "ballast axis." As discussed above, toric contact lens prescriptions define an offset of the ballast axis from the cylindrical axis of the toric zone by a selected angle. The term "offset" is inclusive of angles of 0 degrees or 180 degrees, which describe lenses in which the cylindrical axis is coincident with the ballast axis.

The thickness profile of a toric contact lens (i.e., the thickness for a plurality of contiguous points along a radius of the lens) strongly influences fitting characteristics, such as on-eye comfort and lens stability. As mentioned above, it is desirable that a set of contact lenses exhibit suitable stability for all cylindrical corrections, and it is of course desirable that contact lenses are comfortable to a wearer.

The thickness of the contact lens at any nominal position (i.e., a point) along a profile is affected by several factors including, but not limited to, spherical correction, cylindrical correction, offset, and the stabilization structure. Thus, for a set of contact lenses having different cylindrical corrections (but similar fitting characteristics such as a similar effective base curve and overall diameter), the thickness at least one position of the contact lens will be different than other lenses in the set. However, according to aspects of the present invention, a center thickness that is selected based on cylindrical power can have a considerable effect on comfort of a given lens, and can affect consistency for a set of lenses. That is, for a given set of lenses having a common spherical correction and different cylindrical corrections, by selecting the center thickness of one or more lenses of a set based on cylindrical correction, comfort of lenses in the set can be improved.

The present invention is based on several factors. As mentioned above, it is desirable that lenses in such sets have consistent fitting characteristics over a range of optical corrections. Further, portions of a lens distal from the optical axis of a lens typically have a larger effect on the comfort of the lens than regions nearer the optical axis of the lens. In particular, portions of the lens at or between the outer portions of a central zone 11 and inner portions of the peripheral zone (e.g., in a blend zone 13 or at an outer portion of the central zone 11 or an inner portion of the peripheral zone 12) have a large effect on fitting characteristics. It will be appreciated that consistency of thickness at various locations on a lens may affect perceived comfort associated with both the anterior surface and the posterior surface of the lens. Accordingly, by selecting center thicknesses of lenses of a set of lenses, the difference in thickness among the lenses of a set can be reduced at one or more positions distal to the optical axis.

Although spherical correction, cylindrical correction, and offset affect thicknesses at positions on a lens, these parameters are dictated by the refractive error of a patient's eye, and therefore, from a lens design perspective, lens designers typically select these parameters in order to correct the refractive error.

The Applicant has found, however, that by adjusting the center thicknesses of the lenses based on the cylindrical correction of a toric contact lens, the thicknesses at one or more positions on the lens can be maintained fairly constant over a set of lenses. In a set of contact lenses having different cylindrical corrections, the thickness of lenses in the set, in the regions of particular impact on fitting characteristics can be maintained consistent across the set. It is to be appreciated that a change in center thickness has only a minimal impact on optical correction, which may or may not be compensated for by a change in curvatures of the lens surfaces. Additionally, an effective base curvature of the lens may be altered by the change in center thickness but the impact on fitting characteristics will only be minimal.

Aspects of the present invention are directed to a set of toric contact lenses, where each lens in the set includes a posterior surface and an anterior surface. For each lens in the set, at least one of the posterior and anterior surfaces includes a toric optical zone. Preferably, each lens in the set has a common overall diameter, but a different cylindrical correction. In lenses of a set according to aspects of the invention, the center thicknesses of the lenses are selected to be different than one another so that the thicknesses at a common position distal to the optical axis are more similar among the lenses of the set than if center thicknesses of the lenses are maintained constant. In some embodiments, the thicknesses at one or more positions are substantially the same for all lenses in the set.

Figure 2A:
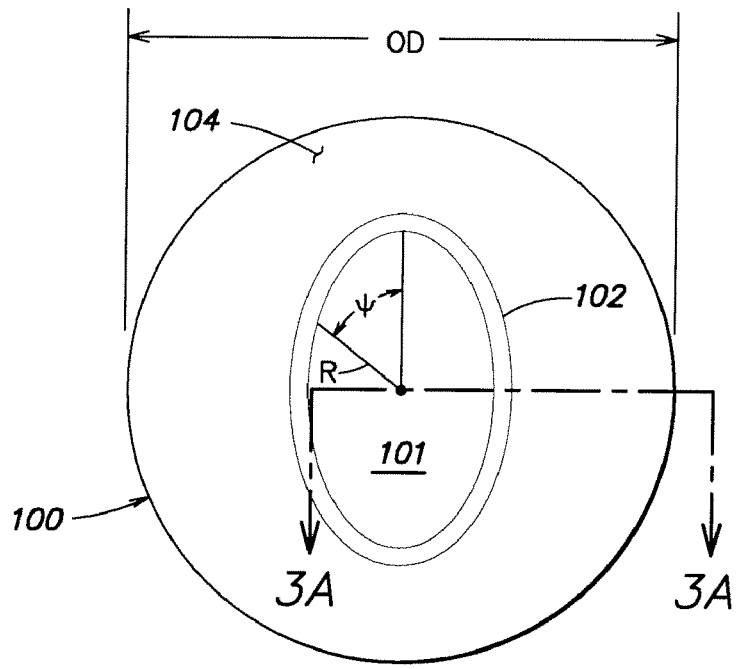
FIGS. 2A and 2B are plan views of two examples of lenses of a set having different center thicknesses (not visible) according to aspects of the present invention, the two lenses have different cylindrical powers.
Figure 2B:
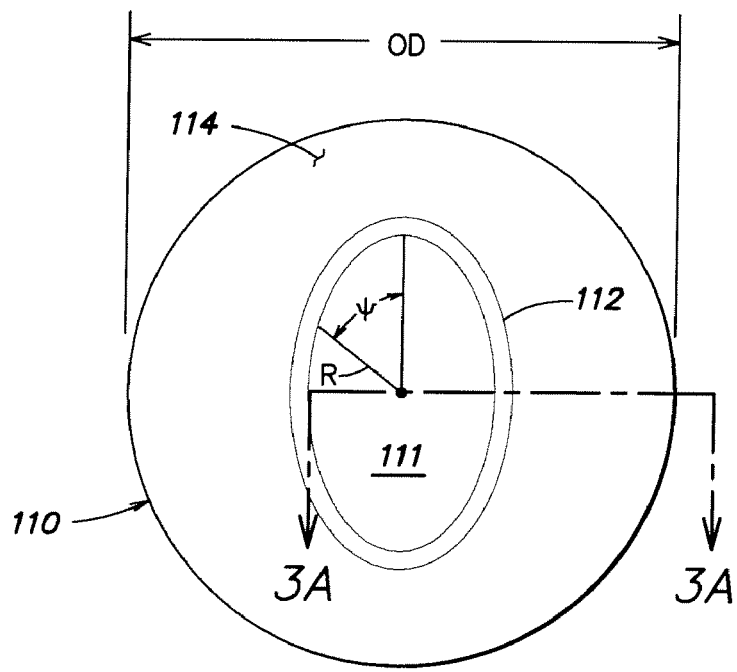

FIGS. 2A and 2B are plan views of exemplary surfaces of lenses 100 and 110 of a set of lenses having different center thickness (see FIG. 3A below) than one another. Each lens comprises a corresponding toric zone 101, 111, a corresponding peripheral zone 104, 114. In some embodiments, each lens has a corresponding blend zone 102, 112. Each lens has an overall diameter O.D. Toric zones 101 and 111 can have any suitable perimeter shape (e.g., elliptical, oval or circular).

It will be appreciated that according to aspects of the present invention, the center thickness of at least two of the lenses (e.g., lenses 100, 110) in a set are selected to be different. Preferably, the thicknesses are selected based on cylindrical correction such that the thicknesses at a selected position away from the optical axis are substantially the same for all lenses in the set. A common position is specified by $\psi$ measured form the ballast axis and R measured from the optical axis of both lenses. Thickness measurement is discussed in greater detail below with reference to FIGS. 3A-3B. Further, the common location at which a thickness is measured on the lenses may be disposed in an optical zone or peripheral zone of one or both of the anterior and posterior surfaces of a given lens in a set. In some embodiments, a common location may be disposed in a blend zone of one or both of the anterior and posterior surfaces of a lens. It is to be appreciated that the common position ($\psi$, R) at which a thickness is measured may correspond to a different zone (i.e., optical zone, peripheral zone or blend zone) on the anterior surface of a lens of the set than on the anterior surface of another lens in the set. That is, the common position may correspond to an optical zone on one lens and a peripheral zone on another lens. Similarly, the common position ($\psi$, R) at which a thickness is measured may correspond to a different zone on the posterior side of a lens of the set than on another lens in the set.

Figure 3A:
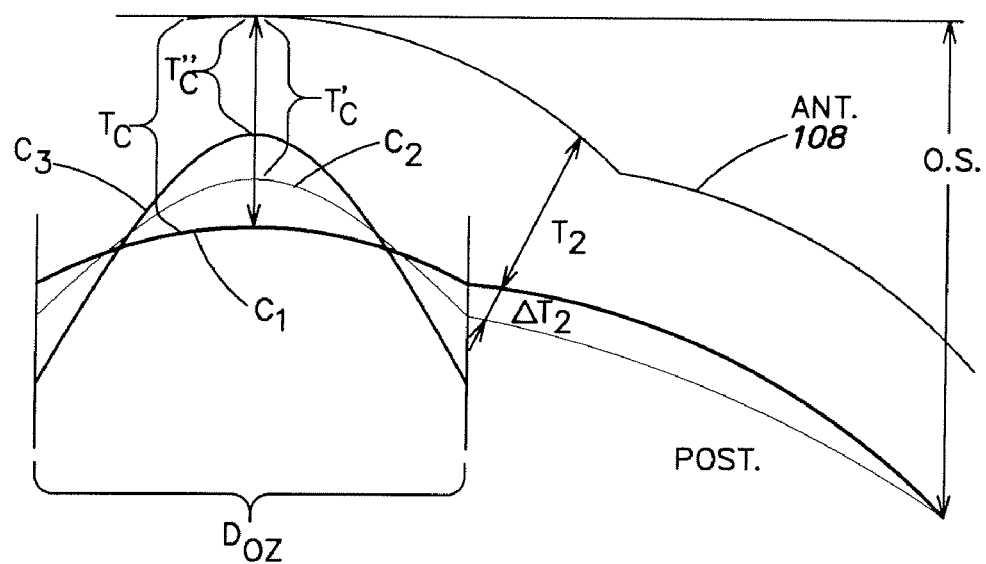
FIG. 3A illustrates superimposed, partial, cross-sectional side views of the two contact lenses in FIGS. 2A and 2B taken along lines 3A-3A in each of FIGS. 2A and 2B.

FIG. 3A illustrates superimposed partial cross-sectional side views of the two contact lenses 100, 110 of FIGS. 2A and 2B. Lenses 100 and 110 have equal optical zone diameters $D_{OZ}$; however, the invention is not so limited and lenses in a set may have different optical zone diameters. The radii of curvature $C_1$ and $C_2$ correspond to lenses in a set having different cylindrical corrections. A thicknesses T is specified at a position on the anterior surface (regardless of which surface(s) are toric) and is measured perpendicular to the anterior surface 108 of the lens. Further, a difference in thickness $\Delta T_2$ may exist between lens 100 and lens 110 due at least in part to the selected center thicknesses and cylindrical corrections. A third lens having a radius of curvature $C_3$ and center thickness TC" is also illustrated.

It is to be appreciated that, as illustrated in Table I below, according to embodiments of the invention, center thickness decreases with decreasing radius of curvature (i.e., $C_1 > C_2 > C_3$ and $T_C > T_C' > T_C''$). Accordingly, the center thicknesses are selected to be smaller for lenses in the set having higher cylindrical power. It is to be appreciated that, according to embodiments of the invention, there need not be a difference in center thickness between all lenses having different cylindrical corrections.

TABLE I

| | Cylindrical Power | | | | | |
|---|---|---|---|---|---|---|
| | $\phi_1$ | $\phi_2$ | $\phi_3$ | $\phi_4$ | $\phi_5$ | $\phi_6$ |
| Center Thickness | X | X | Y | Y | Y | Z |

$\phi_{n+1} > \phi_n$ where $\phi_n$ is cylindrical power and Z, Y and X are center thicknesses measured at a common position; and Z < Y < X.

In some embodiments, center thickness decreases monotonically with increasing cylindrical power across a set of lenses. As defined herein a "monotonically decreasing" parameter is one that decreases, and never increases, but may remain the same for two or more lenses of the set that have different cylindrical power. In some embodiments, all lenses in a set have a same overall sag value OS measured from the center of the anterior surface to the outermost periphery of the posterior surface.

A set as defined herein may comprise three or more lenses. In some embodiments the set comprises four, five, six, seven or eight or more lenses.

Figure 3B:
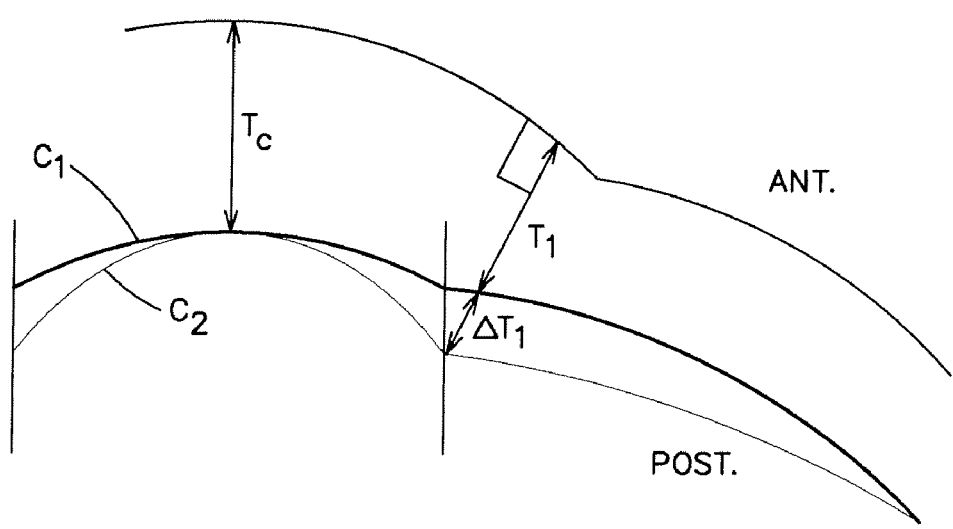
FIG. 3B illustrates superimposed partial cross-sectional side views of two conventional contact lenses of a set in which center thickness is maintained constant regardless of cylindrical power.

FIG. 3B illustrates superimposed partial cross-sectional side views of two conventional contact lenses. It is to be appreciated that, despite having the same curvatures $C_1$ and $C_2$ as lenses 100 and 110 of FIG. 2A, thickness $\Delta T_2$ has a lesser magnitude than thickness $\Delta T_1$ as a result of varying center thickness (i.e., center thickness $T_C$ is greater than center thickness $T_C'$).

A set in which lenses have center thicknesses selected according to cylindrical power (as illustrated in FIG. 3A) provides several advantages over a set in which center thickness is maintained constant. Examples of advantages of such a set include that stability of the lenses can be made more consistent for the lenses of the set, and/or on-eye comfort of a lens can be improved. Aspects of the present invention are applicable to sets of toric contact lenses having any suitable cylindrical corrections. For example, the lenses may range from at least –0.75 diopter to at least –2.25. In some embodiments, the lenses may range from –0.75 diopters to –2.75, and even up to –3.75 diopter or –4.25 diopter or greater.

Each lens in a set will preferably have a thickness at a selected position that is not more than 0.2 mm different than other lenses in the set, and in some embodiments no more than 0.15 mm, and in other embodiments, no more than 0.1 mm. However, substantial lens stability benefits have been established by reducing the variation in the thickness at the selected position to not more than 0.05 mm different than other lenses in a set. Thus, a consistent thickness may be maintained throughout the lens set. In some embodiments, the position is located in a blend zone or at the edge of the central zone or the edge of the peripheral zone in a blend zone of one or more lenses of the set. In some embodiments, the selected position is located at the top of the optical zone of a lens. In some embodiments, the thicknesses at all positions on each of the lenses in a set are not more than 0.2 mm different than other lenses in the set. (The thickness at the "top" of the optical zone is the thickness at the highest optical zone juncture within both the anterior optical zone and the posterior optical zone along the ballast axis.)

In some embodiments, each lens in the set will have a maximum thickness at a top of the optical zone of 0.2 mm. For example, such a maximum thickness is appropriate for lenses made of alphafilcon A. However, for other materials (e.g., balafilcon A) a maximum thickness of 0.14 mm is appropriate. Also, generally each lens will have a maximum thickness in the ballasted area of 0.5 mm, more preferably 0.4 mm. For example such a maximum thickness in the ballasted area is appropriate for both alphafilcon A and balafilcon A.

Each lens in the set will preferably have a posterior optical zone diameter of 6.5 to 10 mm, more preferably 7 to 8 mm, and an anterior optical zone diameter of 6.5 to 10 mm, more preferably, 6.5 to 9 mm.

It is preferred that each lens in the set has a maximum ballast thickness that is not more than 0.05 mm different than other lenses in the set, preferably not more than 0.03 mm. It is also preferred that each lens in the set has a maximum thickness at a top of the optical zone that is not more than 0.05 mm than other lenses in the set, preferably not more than 0.03 mm.

Figure 5:
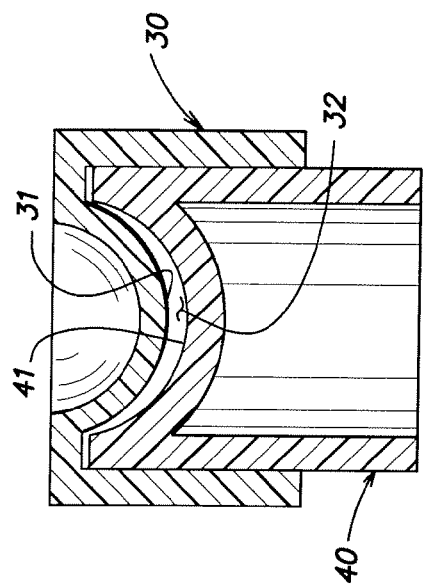
FIG. 5 is a schematic cross-sectional view of an assembled mold assembly shown in FIG. 4.
Figure 4:
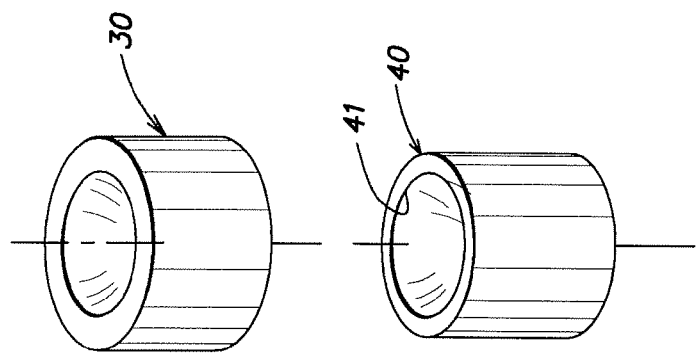
FIG. 4 is a schematic view of one embodiment of a mold assembly for cast molding contact lenses.

According to some embodiments, the lenses of this invention are cast molded by casting the lenses between two mold sections. However, according to aspects of the invention directed to the design of a lens set the method of manufacture is non-essential and any suitable technique of manufacture may be used. An illustrative mold assembly is shown in FIGS. 4 and 5. The mold assembly includes posterior mold 30 having a posterior mold cavity defining surface 31 which forms the posterior surface of the molded lens, and anterior mold 40 having an anterior mold cavity defining surface 41 which forms the anterior surface of the molded lens. When the mold sections are assembled, a mold cavity 32 is formed between the two defining surfaces that corresponds to the desired shape of the contact lens molded therein. Each of the mold sections is injection molded from a plastic resin in an injection molding apparatus.

Subsequent to assembling the mold sections, the monomer mixture is polymerized, such as by exposure to UV light or heat, followed by disassembling the mold assembly and removing the molded lens therefrom. Other processing steps which may be included, depending on the specific process, include lens inspection, hydration in the case of hydrogel contact lenses, and lens packaging.

Table II below is a table of anterior surface molds and posterior surface molds. As illustrated, by selecting a combination of an anterior surface mold and a posterior surface mold to form a mold assembly as illustrated in FIG. 5, a lens of a selected spherical power and cylindrical power can be molded. As described above, each of the lenses in a set according to aspects of the present invention has a common spherical power, a common offset and a different cylindrical power. $C_n$ represents the curvature providing varying cylindrical power $\emptyset_n$ of a given lens. In the table, a lens of cylindrical power $\emptyset_{n+1}$ has a power greater than cylindrical power $\emptyset_n$. For illustrative purposes, in the illustrated table, it is assumed that posterior surface provides cylindrical power. According to aspects of the present invention, one or more of the posterior mold tools that provide the cylindrical power is configured to provide a different center thickness, thereby when a set of lenses of different cylindrical power $\emptyset_{1-9}$ is produced with the mold tools, lenses having center thicknesses varying with cylindrical power will be produced.

It is to be appreciated that, by selecting a surface of the mold to that provides cylindrical power (i.e., the posterior surface in the illustrated embodiment) to be configured so as to alter the center thickness, the number of tools to achieve a set according to aspects of the present invention is economized. Although five posterior tools and two anterior tools were used for illustrative purposes, any suitable number of each of the anterior and posterior tools may be used to produce sets according to aspects of the invention.

TABLE II

|  |  | POST. TOOLS | | | | |
| --- | --- | --- | --- | --- | --- | --- |
|  |  | $C_1$ | $C_2$ | $C_3$ | $C_4$ | $C_5$ |
| ANT. | 1 | $\phi_1$ | $\phi_2$ | $\phi_3$ | $\phi_4$ | $\phi_5$ |
| TOOLS | 2 | $\phi_6$ | $\phi_7$ | $\phi_8$ | $\phi_9$ |  |

It will be appreciated that the posterior tools constitute a plurality of second mold tools, each of the plurality of second mold tools being configured to produce a posterior surface of at least one of a plurality of lenses, and anterior tools constitute a plurality of first mold tools, each of the plurality of first mold tools being configured to produce a first surface. The plurality of first mold tools and the plurality of second mold tools are configured such that combinations of ones of the plurality of second mold tool with ones of the plurality of first mold tools are capable of producing a set of contact lenses, each of the lenses having a common spherical correction as the other lenses in the set and different cylindrical powers, the center thicknesses of said lenses monotonically decreasing as a function of increasing cylindrical power.

It will also be appreciated that if only one of the anterior tools is used (e.g., Anterior Tool #1), that anterior tool will constitute a second mold tool configured to produce a second surface of each of a plurality of lenses; and the posterior tools constitute a plurality of first mold tools being configured, such that combinations of the second mold tool (e.g., Anterior Tool #1) with each of the plurality of first mold tools (e.g., the Posterior Tools) are capable of producing a set of lenses each lens having a common spherical correction with the other lenses in the set and a different cylindrical correction, the center thicknesses of said lenses monotonically decreasing as a function of increasing cylindrical power. Although the present example illustrates having a plurality of posterior tools and a single anterior tool, in some embodiments, a plurality of anterior tools and a single posterior tool may be used to generate a set of lenses according to aspects of the invention.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. A set of toric contact lenses, each lens in the set including a posterior surface, an anterior surface, a peripheral zone and a center thickness, at least one of said surfaces including a toric optical zone, each lens in the set having a common spherical correction with the lenses in the set and different cylindrical correction, the center thicknesses of the lenses decreasing monotonically with increased cylindrical power,
wherein the thicknesses of the lenses measured at a common position differ by no more than 0.2 mm.

2. The set of lens of claim 1, wherein a perimeter of the toric optical zone is circular.

3. The set of lenses of claim 1, wherein a perimeter of the toric optical zone is oval.

4. The set of lenses of claim 1, wherein the lenses include blend zones.

5. The set of lenses of claim 1, wherein the overall sag of all of the lenses of the set are equal.

6. The set of lenses of claim 1, wherein all of the lenses in the set have a same optical zone diameter as one another.

7. The set of lenses of claim 1, wherein the cylindrical power of the lenses in the set ranges from at least −0.75 diopters to at least −2.75 diopters.

8. The set of lenses of claim 1, wherein the common position is disposed at the top of the anterior optical zone of the lenses.

9. The set of lenses of claim 1, wherein all of the lenses that have different cylindrical powers also have different center thicknesses.

10. The set of lenses of claim 1, wherein the set comprises at least three lenses.

11. The set of lenses of claim 1, wherein the set comprises at least four lenses.

12. The set of lenses of claim 1, wherein the set comprises at least five lenses.

13. The set of lenses of claim 1, wherein the set comprises at least six lenses.

14. The set of lenses of claim 1, wherein the cylindrical power of the lenses in the set ranges from at least −0.75 diopters to at least −2.25 diopters.

15. A set of mold tools, comprising;
a plurality of first mold tools, each of the plurality of first mold tools being configured to produce a first surface of one of a plurality of lenses, the first surfaces all being anterior surfaces or all of the first surfaces being posterior surfaces, said surfaces all being toric; and
a second mold tool configured to produce a second surface of each of the plurality of lenses, the plurality of first mold tools being configured such that combinations of the second mold tool with each of the plurality of first mold tools are capable of producing a set of lenses each lens having a common spherical correction with the other lenses in the set and a different cylindrical correction, the center thicknesses of said lenses monotonically decreasing as a function of increasing cylindrical power,
wherein the thicknesses of the set of lenses measured at a common position differ by no more than 0.2 mm.

16. The set of molds of claim 15, wherein the cylindrical power of the set of lenses ranges from at least −0.75 diopters to at least −2.75 diopters.

17. The set of molds of claim 15, wherein the common position is disposed at the top of the anterior zone of the lenses.

18. The set of molds of claim 15, wherein the plurality of first mold tools comprises at least three tools.

19. The set of molds of claim 15, wherein the plurality of first mold tools comprises at least four tools.

20. The set of molds of claim 15, wherein the plurality of first mold tools comprises at least five tools.

21. The set of molds of claim 15, wherein the plurality of first mold tools comprises at least six tools.

22. The set of mold tools of claim 15, wherein the cylindrical power of the lenses in the set ranges from at least −0.75 diopters to at least −2.25 diopters.

23. A set of mold tools, comprising;
a plurality of first mold tools, each of the plurality of first mold tools being configured to produce a first surface of one of a plurality of lenses, the first surfaces all being anterior surfaces or all of the first surfaces being posterior surfaces, said surfaces all being toric; and
a plurality of second mold tools, each of the plurality of second mold tools being configured to produce a second surface of at least one of the plurality of lenses, the plurality of first mold tools and the plurality of second mold tools being configured such that combinations of ones of the plurality of second mold tool with ones of the plurality of first mold tools are capable of producing a set of lenses having a common spherical correction with the other lenses in the set and different cylindrical power, the center thicknesses of said lenses monotonically decreasing as a function of increasing cylindrical power,
wherein the thicknesses of the set of lenses measured at a common position differ by no more than 0.2 mm.

24. The set of mold tools of claim 23, wherein the cylindrical power of the lenses in the set ranges from at least −0.75 diopters to at least −2.25 diopters.

* * * * *